US011929062B2

(12) United States Patent
Kuo et al.

(10) Patent No.: US 11,929,062 B2
(45) Date of Patent: Mar. 12, 2024

(54) END-TO-END SPOKEN LANGUAGE UNDERSTANDING WITHOUT FULL TRANSCRIPTS

(71) Applicant: INTERNATIONAL BUSINESS MACHINES CORPORATION, Armonk, NY (US)

(72) Inventors: Hong-Kwang Jeff Kuo, Pleasantville, NY (US); Zoltan Tueske, White Plains, NY (US); Samuel Thomas, White Plains, NY (US); Yinghui Huang, New York, NY (US); Brian E. D. Kingsbury, Cortlandt Manor, NY (US); Kartik Audhkhasi, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 17/021,956

(22) Filed: Sep. 15, 2020

(65) Prior Publication Data

US 2022/0084508 A1 Mar. 17, 2022

(51) Int. Cl.
*G06F 40/30* (2020.01)
*G06N 3/08* (2023.01)
(Continued)

(52) U.S. Cl.
CPC ................ *G10L 15/16* (2013.01); *G06N 3/08* (2013.01); *G10L 15/02* (2013.01);
(Continued)

(58) Field of Classification Search
CPC ........ G06F 40/295; G06F 40/30; G06F 40/20; G06F 40/56; G10L 15/1822; G10L 15/22;
(Continued)

(56) References Cited

U.S. PATENT DOCUMENTS 8,977,549 B2 3/2015 Deligne et al.
10,635,751 B1 * 4/2020 Relangi .................. G06F 40/35
(Continued)

FOREIGN PATENT DOCUMENTS

CN 110287283 A 9/2019
CN 110838288 A 2/2020
CN 110853626 A 2/2020

OTHER PUBLICATIONS

International Search Report and Written Opinion dated Nov. 2, 2021 in related application PCT/CN2021/108871; 10 pgs.
(Continued)

*Primary Examiner* — Jakieda R Jackson
(74) *Attorney, Agent, or Firm* — Intelletek Law Group, PLLC; Gabriel Daniel, Esq.

(57) ABSTRACT

A method and system of training a spoken language understanding (SLU) model includes receiving natural language training data comprising (i) one or more speech recording, and (ii) a set of semantic entities and/or intents for each corresponding speech recording. For each speech recording, one or more entity labels and corresponding values, and one or more intent labels are extracted from the corresponding semantic entities and/or overall intent. A spoken language understanding (SLU) model is trained based upon the one or more entity labels and corresponding values, and one or more intent labels of the corresponding speech recordings without a need for a transcript of the corresponding speech recording.

20 Claims, 10 Drawing Sheets

(51) Int. Cl.
*G10L 15/02* (2006.01)
*G10L 15/16* (2006.01)
*G10L 15/18* (2013.01)
*H04L 65/60* (2022.01)
*H04L 67/10* (2022.01)

(52) U.S. Cl.
CPC .......... *G10L 15/1815* (2013.01); *H04L 65/60* (2013.01); *H04L 67/10* (2013.01)

(58) Field of Classification Search
CPC ... G10L 15/063; G10L 15/16; G10L 15/1815; G10L 2015/223; G10L 15/18; G10L 2015/088; G06N 20/00; G06N 3/08
See application file for complete search history.

(56) References Cited

U.S. PATENT DOCUMENTS 10,679,613 B2 6/2020 Wabgaonkar et al.
11,194,974 B2* 12/2021 Malon ..................... G06F 40/40
11,475,883 B1* 10/2022 Mallikarjuniah ....... G10L 15/30
11,531,822 B1* 12/2022 Dong ..................... G06N 20/00
11,574,637 B1* 2/2023 Kumar .................... G06F 40/30
2004/0249637 A1* 12/2004 Baker ................. G10L 15/1822 704/239
2006/0080101 A1* 4/2006 Chotimongkol ........ G06F 40/30 704/E15.026
2006/0149555 A1* 7/2006 Fabbrizio .............. G10L 15/063 704/E15.04
2009/0132252 A1 5/2009 Malioutov et al.
2011/0029313 A1 2/2011 Braho et al.
2011/0307252 A1* 12/2011 Ju ....................... G10L 15/1822 704/E15.014
2013/0317818 A1* 11/2013 Bigham .................. G10L 15/26 704/235
2013/0332450 A1* 12/2013 Castelli ............... G06F 16/9535 707/E17.046
2015/0294590 A1* 10/2015 Kullok ................... G09B 19/00 434/236
2017/0372200 A1 12/2017 Chen et al.
2019/0065556 A1* 2/2019 Kumar ................ G06F 16/3329
2019/0066668 A1* 2/2019 Lin ......................... G10L 15/22
2019/0332946 A1* 10/2019 Han ....................... G06N 20/00
2019/0385595 A1* 12/2019 Wabgaonkar ........... G10L 15/16
2020/0175961 A1* 6/2020 Thomson ................ G10L 15/28
2020/0251091 A1* 8/2020 Zhao ...................... G06N 5/022
2020/0314239 A1* 10/2020 Salter ................ H04M 3/42382
2020/0357392 A1* 11/2020 Zhou ................... G10L 15/1822
2021/0004438 A1* 1/2021 Iter ....................... G06F 40/295
2021/0086070 A1* 3/2021 Albright ................. G06F 3/167
2021/0104234 A1* 4/2021 Zhang ................... G10L 15/197
2021/0303784 A1* 9/2021 Brdiczka ................. G06F 40/35
2021/0357409 A1* 11/2021 Rodriguez ............ G06F 40/157
2022/0038514 A1* 2/2022 Long .................. H04L 65/1006

OTHER PUBLICATIONS

Mell, P. et al., “Recommendations of the National Institute of Standards and Technology”; NIST Special Publication 800-145 (2011); 7 pgs.

Gupta, N. et al., “The AT&T Spoken Language Understanding System”; IEEE Transactions on Audio, Speech, and Language Processing (2006); vol. 14:1; pp. 213-222.

Firdaus, M. et al., “A Deep Multi-Task Model for Dialogue Act Classification, Intent Detection and Slot Filling”; Cognitive Computation (2020); 20 pgs.

Caubriere, A. et al., “Curriculum-Based Transfer Learning for an Effective End-To-End Spoken Language Understanding and Domain Portability”, Proc. Interspeech (2019), pp. 1198-1202, arXiv: 1906.07601v1.

Liu, B. et al., “Attention-Based Recurrent Neural Network Models for Joint Intent Detection and Slot Filling”, arXiv preprint arXiv:1609.01454 (2016), 5 pgs.

Liu, B. et al., “Joint Online Spoken Language Understanding and Language Modeling with Recurrent Neural Networks”, arXiv preprint arXiv:1609.01462 (2016), 9 pgs.

Mesnil, G. et al., “Using Recurrent Neural Networks for Slot Filling iln Spoken Language Understanding”, IEEE/ACM Trans. on Audio, Speech, and Language Processing (2015), vol. 23:3, pp. 530-539.

Lugosch, L. et al., “Speech Model Pre-Training for End-To-End Spoken Language Understanding”, in Proc. Interspeech (2019), pp. 814-818, arXiv:1904.03670v2.

Haghani, P. et al., “From Audio to Semantics: Approaches to End-To-End Spoken Language Understanding”, in Proc. IEEE SLT Workshop (2018), pp. 720-726, arXiv:1809.09190v1.

Ghannay, S. et al., “End-To-End Named Entity and Semantic Concept Extraction from Speech”, in Proc. IEEE SLT Workshop (2018), pp. 692-699.

Hochreiter, S. et al., “Long Short-Term Memory”, Neural Computation (1997), vol. 9:8, pp. 1735-1780.

Huang, Y. et al., “Leveraging Unpaired Text Data for Training End-To-End Speech-To-Intent Systems”, in Proc. ICASSP (2020), pp. 7984-7988, arXiv:2010.04284v1.

Qian, Y. et al., “Exploring ASR-Free End-To-End Modeling to Improve Spoken Language Understanding in A Cloud-Based Dialog System”, in Proc. IEEE ASRU Workshop (2017), pp. 569-576.

Chen, Y. et al., “Spoken Language Understanding Without Speech Recognition”, in Proc. ICASSP (2018), pp. 6189-6193.

Tuske, Z. et al., “Single Headed Attention Based Sequence-To-Sequence Model for State-Of-The-Art Results On Switchboard-300,” arXiv preprint arXiv:2001.07263 (2020), 5 pgs.

* cited by examiner

Figure 2:
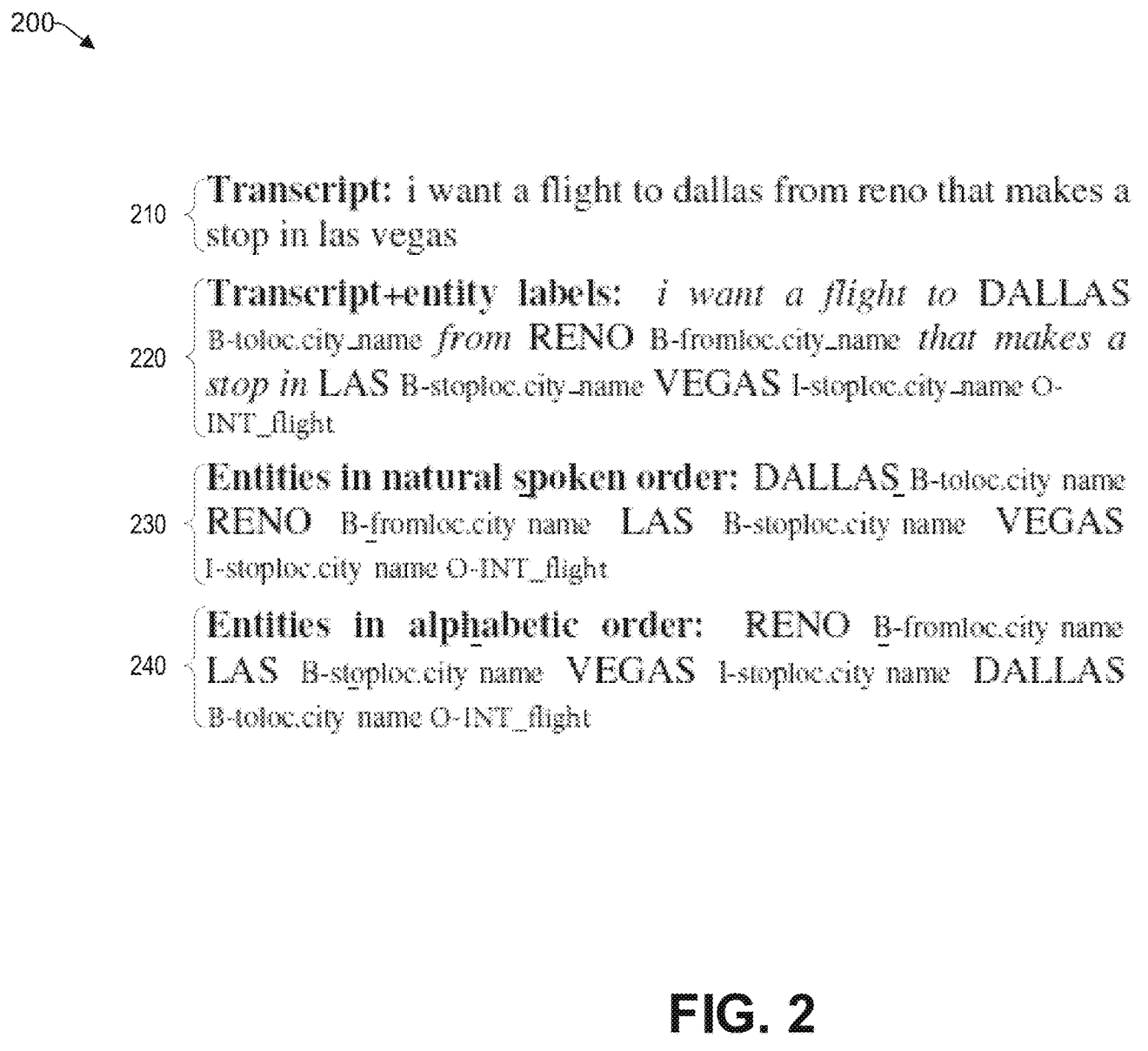

200

210 Transcript: i want a flight to dallas from reno that makes a stop in las vegas 220 Transcript+entity labels: *i want a flight to* DALLAS B-toloc.city_name *from* RENO B-fromloc.city_name *that makes a stop in* LAS B-stoploc.city_name VEGAS I-stoploc.city_name O-INT_flight 230 Entities in natural spoken order: DALLAS B-toloc.city name RENO B-fromloc.city name LAS B-stoploc.city name VEGAS I-stoploc.city name O-INT_flight 240 Entities in alphabetic order: RENO B-fromloc.city name LAS B-stoploc.city name VEGAS I-stoploc.city name DALLAS B-toloc.city name O-INT_flight

| Training Data | Adapt | CTC | Attention |
|---|---|---|---|
| [1A] Full transcripts | Y | 91.7 | 92.9 |
| [2A] Full transcripts | N | 91.7 | 93.0 |
| [3A] Entities, spoken order | Y | 92.7 | 92.8 |
| [4A] Entities, spoken order | N | 91.5 | 92.6 |
| [5A] Entities, alphabetic order | Y | 73.5 | 90.9 |
| [6A] Entities, alphabetic order | N | 61.9 | 90.6 |

| Training Data | Adapt | CTC | Attention |
|---|---|---|---|
| [1B] Full transcripts | Y | 85.5 | 92.0 |
| [2B] Full transcripts | N | 79.6 | 91.3 |
| [3B] Entities, spoken order | Y | 88.6 | 91.2 |
| [4B] Entities, spoken order | N | 86.5 | 89.6 |
| [5B] Entities, alphabetic order | Y | 73.8 | 88.8 |
| [6B] Entities, alphabetic order | N | 68.5 | 87.7 |

| ASR Training | Attention |
|---|---|
| None | 78.1 |
| Switchboard 300h | 92.6 |
| Switchboard 2000h | 93.8 |

FIG. 3C

END-TO-END SPOKEN LANGUAGE UNDERSTANDING WITHOUT FULL TRANSCRIPTS

BACKGROUND

Technical Field

The present disclosure generally relates to computer systems, and more particularly, to computer systems that are configured to extract meaning from spoken audio data.

Description of the Related Art

In recent years, spoken language understanding (SLU) and automatic speech recognition (ASR), have become increasingly salient in a variety of applications, including, without limitation, interactive spoken conversational systems and call center analytics that understand agent-customer dialogues. ASR is an interdisciplinary subfield of computer science and computational linguistics that provides technologies and methods that enable the recognition of spoken language by computers. It incorporates knowledge and research in the computer science, linguistics and computer engineering fields. ASR converts speech to text (e.g., words). In contrast, SLU converts speech to meaning (e.g., semantically annotated text). Training models for speech recognition typically involves a corpus of voice data that includes a transcript thereof.

SUMMARY

According to various embodiments, a computing device, a non-transitory computer readable storage medium, and a method are provided for training a spoken language understanding (SLU) model. During a training phase, natural language training data including (i) one or more speech recording, and (ii) a set of semantic entities and/or an overall intent is received for each corresponding speech recording. For each speech recording, one or more entity labels and corresponding values, and one or more intent labels are extracted from the corresponding semantic entities and/or overall intent. A spoken language understanding (SLU) model is trained based upon, the one or more entity labels and corresponding values, and one or more intent labels of the corresponding speech recordings, without a need for the semantic entities to have a transcript of the corresponding audio speech recording.

In one embodiment, the semantic entities are not in spoken order. The semantic entities can be in alphabetical order.

In one embodiment, the extraction and training are based on an attention-based encoder-decoder neural network model.

In one embodiment, the natural language training data is based on a combination of different types of training data.

In one embodiment, a pre-processing alignment is performed to align the semantic entities into spoken order.

In one embodiment, the training data is based on transaction data between a user and an administrator helping the user with a task.

In one embodiment, the training data includes a record of transaction data comprising a bag of entities.

In one embodiment, the extraction of the one or more entity labels and corresponding values, and the one or more intent labels is by way of a neural network processing. In various embodiments, connectionist temporal classification (CTC), recurrent neural network transducer (RNN-T), and attention-based encoder-decoder neural network models can be used.

In one embodiment, the training involves a transfer learning comprising initializing a spoken language (SLU) model on an ASR model.

In one embodiment, during an active phase, raw spoken language data is received that includes an audio speech recording without a transcript of the audio speech recording. The trained SLU model is applied to recognize a meaning of the raw spoken language data, wherein the meaning includes an intent and semantic entities of the raw spoken language. The SLU model is applied to recognize overall intent and semantic entities in the spoken language.

By virtue of limiting the computation to a reduced pool of relevant data, the computational demand on a computing device performing the actions is conserved, as well as an amount of training data in a repository, thereby providing a more efficient computational platform.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 2 illustrates examples of training data for determining the meaning of an utterance.

FIG. 3A provides a summary table of the evaluation of a bag-of entities slot filling F1 score for speech input using a connectionist temporal classification and attention-based models.

FIG. 3B, which provides a summary table of a bag-of entities slot filling F1 score for speech input with additive street noise.

FIG. 3C shows a table of how the amount of data used to train the ASR model for initializing SLU training affects the final F1 score.

DETAILED DESCRIPTION

Overview

Figure 1:
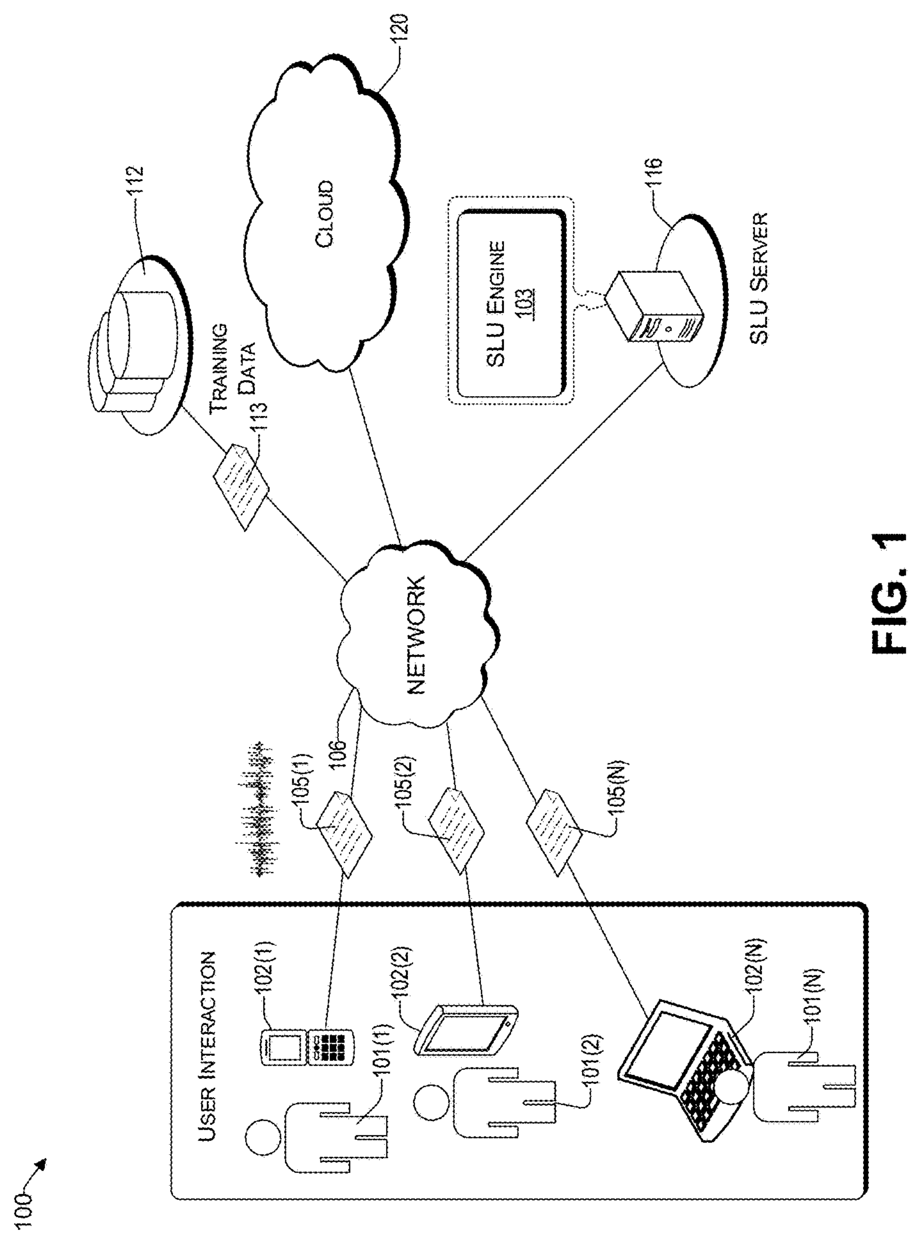
FIG. 1 illustrates an example architecture of a system for end-to-end spoken language understanding without full transcripts, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of automatically training models to understand spoken language in a computationally efficient way. A salient aspect of spoken language understanding (SLU) involves the concept of slot filling, where the meaning of a spoken utterance is represented by using semantic entity labels. The teachings herein provide an end-to-end (E2E) spoken language understanding system that directly converts speech input to semantic entities. In one aspect, in contrast to traditional approaches, the E2E SLU models discussed herein can be trained on semantic entity annotations, without word-for-word transcripts. Training such models is very useful as it can substantially reduce the computational complexity of data collection. In various embodiments, two types of such speech-to-entities models are provided, namely a connectionist temporal classification (CTC) model and an attention-based encoder-decoder model, by adapting models trained originally for speech recognition. Given that the experiments discussed herein involve speech input, these systems recognize both the semantic entity label and words representing the semantic entity value correctly. Applicants have determined that there is negligible degradation when trained on just entities versus full transcripts. In one embodiment, entities are reordered, thereby achieving only about 2% degradation in speech-to-bag-of-entities F1 score.

The teachings herein provide speech inputs in an end-to-end (E2E) spoken language understanding (SLU) framework, taking speech as input and returning entity labels (sometimes referred to herein as semantic entity annotations) and values. In one aspect, the trained SLU model of the present system is operative to understand the meaning of what was spoken. In contrast to automatic speech recognition (ASR), where word for word accuracy is desired, the present SLU is not very sensitive to every word or even how it was uttered (e.g., order of entities, word choices, etc.) as long as the meaning of the utterance is preserved. As a result, the present SLU system may not need training data in the form of word-for-word transcripts, which are time consuming and computationally expensive to obtain and process for a new domain.

SLU systems have traditionally been a cascade of an automatic speech recognition (ASR) system converting speech into text followed by a natural language understanding (NLU) system that interprets the meaning of the text. In contrast, in one embodiment, an E2E SLU system processes speech input directly into meaning without going through an intermediate text transcript. In one embodiment, the teachings herein can train an E2E SLU system using a set (or bag) of entities that do not match the spoken order of an utterance. Such freedom from a specific order of entities, may enable the system to train on speech data from, for example, customer calls with an administrator paired with transaction data. In various embodiments, the transaction data may be provided automatically by the computing device or produced by a human agent. For example, consider a chatbot or a human agent helping a client with a task such as a flight reservation, resulting in a transaction record including a set of entities. This record could serve as light supervision for training a model that is operative to comprehend the meaning of an utterance. When performed by a human, accurate verbatim transcription of speech data typically involves 5-10 real-time, not to mention additional costs for labeling entities. In contrast, the transaction record including the bag of entities is obtained during the course of helping the customer, whether by human or chatbot, and has no additional cost. By using the speech recording and the bag of entities in training without a need for a transcript, there is a technical improvement in that the computational complexity and cost of data collection is substantially reduced, while the volume of training data is improved, thereby improving the accuracy of the computing device performing the analysis of the spoken language. The techniques described herein may be implemented in a number of ways. Example implementations are provided below with reference to the following figures.

Example Architecture

FIG. 1 illustrates an example architecture 100 of a system for end-to-end spoken language understanding without full transcripts, consistent with an illustrative embodiment. Architecture 100 may include one or more conversation entities 101(1) to 101(N) who can participate in conversations with each other by way of sending and receiving electronic data packages 105(1) to 105(N) over a network 106. The conversation entities are typically individuals (e.g., human users) but may also include chatbots that are configured to communicate with human users. The electronic data packages 105(1) to 105(N) are sometimes referred to herein as spoken language data or simply speech input. The spoken language data includes raw voice data (e.g., speech recording). In some embodiments, the spoken language data also includes a set of entities, discussed in more detail later.

The architecture 100 may further include a historical data repository 112 operative to provide training data 113 that may be used to train a speech recognition model. The architecture 100 includes a spoken language understanding (SLU) server 116 that hosts an SLU 103. There is a network that 106 allows the various user devices 102(1) to 101(N) communicate with each other, as well as allow spoken language data to be harvested and stored at the historical data repository 112. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various databases, potential participants, the Internet, and the cloud 120.

For discussion purposes, different user/computing devices appear in the drawing, to represent some examples of the client devices that may be used by a user (e.g., 101(1) to 102(N)) to communicate over the network 106. Today, user devices typically take the form of portable handsets, smartphones, tablet computers, personal digital assistants (PDAs), and smart watches, although they may be implemented in other form factors, including consumer, medical, and business electronic devices.

The historical data repository 112 is configured to store and maintain a large set of training data 113, which includes data related to prior conversations between various users, from which the SLU engine 103 can learn from. For example, the historical data repository 112 may provide training data related to conversations that have been successfully segmented and its meaning identified and labeled. In one embodiment, the training data 113 serves as a corpus of data from which the SLU 103 can learn from to create and/or train a spoken language understanding model, which can then be used to evaluate a meaning of a conversation between one or more entities 102(1) to 102(N) without having a transcript thereof.

In one embodiment, during a training stage of the spoken language understanding system, spoken language data 105 (1) to 105(N) is harvested from one or more user devices 102(1) to 102(N) over the network 106. In various embodiments, the harvesting may be performed by the SLU engine 103 running on the SLU server 116 or directly by a historical data repository 112. In one embodiment, the harvesting can be performed by a distributed computing architecture on a cloud 120. The spoken language data (e.g., 105(1) to 105 (N)) comprises (i) audio speech recording and (ii) a set of semantic entities and/or intents.

In one embodiment, the semantic entities and/or intents of the spoken language data do not include a transcript of the audio speech recording. In other embodiments, the transcript can be filtered out (e.g., by the SLU engine 103) before it is stored in the historical data repository 112 or later upon receiving the data from the historical data repository 112. Stated differently, the entity labels/values and intent labels are extracted from the semantic entities without a verbatim transcript of the speech recording. For example, the entity labels/values and intent labels in the written transcript (if provided) are extracted therefrom and words other than the entity labels/values and intent labels, are removed.

At predetermined intervals or upon a trigger event, the SLU engine 103 receives the training data 113, which it can use to train a SLU model without the need for a verbatim transcript of the speech recording, thereby substantially reducing the volume of the historical data and the computation overhead of the SLU server 116. The trained SLU model can then be used by the SLU 103 engine, during an active stage, to facilitate an understanding of the meaning of the speech recording. Each of these features is discussed in more detail below.

It will be understood that the sheer volume of training data 113 and the electronic data packages 105(1) to 105(N) received by the SLU 103 may provide a technical challenge for the computing resources of the SLU server 116 hosting the SLU 103, including processing time and memory resources of the SLU server 116. In this regard, in one embodiment, the SLU 103 is configured to filter out utterances that are beyond the scope of entity labels and intent labels. For example, utterances such as inconsequential phrases (e.g., incoherent, or inconsequential, such as "uhm," "ahh," "let me think," "like," etc.), referred to herein as not being interactionally defined, as well as other terms that are not immediately related to an entity label or an intent label are removed by the SLU engine 103. In this way, a technical effect of conserving valuable computing and storage resources of the SLU server 116 and/or historical database 112 is achieved. By virtue of limiting the computation to a reduced pool of relevant data, the computational demand on the SLU server 116 is conserved, thereby providing a more efficient computational platform.

While the historical data repository 112 and the SLU server 116 and computing devices 102(1) to 102(N) are illustrated by way of example to be on different platforms, it will be understood that in different embodiments, these platforms may be combined. In other embodiments, one or more of these computing platforms may be implemented by virtual computing devices in the form of virtual machines or software containers that are hosted in the cloud 120, thereby providing an elastic architecture for processing and storage. The cloud is discussed in more detail later.

Example Semantic Entities

Reference now is made to FIG. 2, which illustrates examples of training data 200 for determining the meaning (i.e., intent and semantic entity labels and values) of an utterance. For speech recognition, the training data is usually pairs of utterances (e.g., voice recordings) and verbatim transcripts as shown in transcript 210 in the example of FIG. 2. In order to train an SLU model that can perform intent classification and semantic slot filling, such sentences are typically further labeled with intents and semantic entities, as shown in example 220. Stated differently, known approaches typically use a transcript plus intent and semantic entity labels 220.

In contrast, the SLU engine 103 is configured to train on speech that is paired with just the semantic entities. As used herein, a semantic entity includes a label—value pair. For example, "toloc.city_name" is the label and "Boston" is the value of the semantic entity. In this regard, example 230 shows the semantic entities presented in natural spoken order for training. More particularly example 230 differs from example 220 in that words that are not part of the semantic entities are excluded. The semantic entities can be thought of as the more salient keywords. It should be noted that this does not mean that the other words (that were excluded) do not carry any meaning. For example, "to" and "from" are operative to determine whether a city is a destination or departure city. In our trained SLU model, such words will not be output, but the speech signal corresponding to those words will help the model to output the correct semantic entity label. Similarly, example 230 differs from example 220 in that certain salient words (e.g., "want a flight"), which may be relevant to determine the intent, are absent. The SLU engine is able to train with just the intent label ("O-INT-flight").

In one embodiment, the semantic entities need not be output in a spoken order but may be arbitrary or any predetermined order. In example 240, the semantic entities are not given in spoken order, but instead are sorted alphabetically according to entity label name. This simulates the semantic frame or bag of entities concept where the order of entities does not affect the meaning: {{fromloc.city name: RENO}, {stoploc.city name: LAS VEGAS}, {toloc.city name: DALLAS}}.

Example Adaption of ASR Models into SLU Systems

In various embodiments, since there are different ways in which SLU data can be transcribed, different methods are presented herein to train an SLU system. Starting from a pre-trained ASR model, architectures are discussed below to explain how two different kinds of E2E models behave when used to model the various kinds of SLU data. Each possible training procedure may employ one or more of the following modules.

In one embodiment, an ASR model adaptation to domain data (ASR-SLU adapt) module is used. Given that an off-the-shelf ASR model is likely trained on data that is acoustically different from the SLU data, an initial step is to adapt the ASR system. For example, the parameters of the ASR model are adapted to perform better on the domain data in the task of ASR (i.e., speech transcription into words). This act, which only uses verbatim transcripts, adapts the model to the novel acoustic conditions, words, and language constructs present in the SLU domain data. In model adaptation, one may use both the original general-purpose ASR data (GP-ASR) and the domain data to provide better coverage of the ASR output units than adapting only on the domain data. For example, this coverage may be related to the vocabulary or set of units modeled by the ASR (e.g., phones, characters, words, etc.) some of which may not appear in the domain data. Coverage is improved by using a large amount of general data.

In one embodiment, a joint ASR and SLU model training (e.g., joint ASR+SLU) is used. Entity labels are introduced into the training pipeline along with the full transcripts. This module is a form of curriculum learning that gradually modifies an off-the-shelf ASR model into a full-fledged SLU model. Unlike traditional approaches, the model is now trained to output non-acoustic entity tokens in addition to the usual graphemic or phonetic output tokens. For GP-ASR data, the targets are graphemic/phonetic tokens only, whereas for the SLU domain data, the targets also include entity labels. Although this module is a natural progression in training the final SLU model, it can be skipped if sufficient SLU resources are available.

In one embodiment, an SLU model fine tuning (e.g., fine tune SLU) is used. In this final module, a model from the first or second module discussed hereinabove is finetuned on just the SLU data to create the final SLU model. As described earlier, the semantic entities that are to be recognized by the final SLU model may take different forms: within a full transcript, entities only in spoken order, or entities only in alphabetic order.

Example Training End-to-End SLU Models

Using the training procedure described hereinabove, in various embodiments, two variants of end-to-end SLU systems that attempt to directly recognize entities in speech are provided without intermediate text generation and text-based entity detection. By way of example, a database, which may be a publicly available corpus from a consortium can be used, while it will be understood that other data can be used as well.

In one embodiment, SLU data and evaluation metric method is used with a standard training and test sets. By way of demonstrative example only and not by way of limitation, 4978 training utterances from Class A (i.e., context independent) training data in one dataset and 893 test utterances from other datasets are used.

In the present example, the 4976 training utterances include 9.64 hours of audio from 355 speakers. The 893 test utterances include 1.43 hours of audio from 55 speakers. To better train the proposed E2E models, additional copies of the corpus can be created using speed/tempo perturbation. The final training corpus after data augmentation is 140 hours of audio data. The slot filling performance is measured with an F1 score. When using speech input instead of text, word errors can arise. The F1 score provides that both the slot label and value to be correct. For example, if the reference is toloc.city name: New York but the decoded output is toloc.city name: York, then the SLU engine count both a false negative and a false positive. In one embodiment, it is not sufficient that the correct slot label is produced: no "partial credit" is given for part of the semantic entity value (York) being recognized. The scoring may ignore the order of entities, and is therefore suitable for the "bag-of-entities" case.

In one embodiment, Connectionist temporal classification (CTC) based SLU models are used. To allow the SLU model to process entities and corresponding values independent of an external language model, a word CTC model can be constructed on general purpose ASR data. By way of example only and not by way of limitation, 300 hours of a predetermined type of data, such as Switchboard (SWB-300) data can be used. As is known in the art, SWB-300 is readily available public data for speech recognition. In various embodiments, different training methods can be used to train CTC based SLU models.

A first experiment assumes that both verbatim transcripts and entity labels for the SLU data are available. In this regard, all three training modules described hereinabove are used. By way of example and not by way of limitation, the ASR-SLU adapt step can be performed as follows. The output layer of the ASR model, which estimates scores for 18,324-word targets and the blank symbol, is replaced with a randomly initialized output layer that estimates scores for 18,642 word/entity targets and the blank. The weights of the remaining 6 LSTM layers, each with 640 units per direction, and a fully connected bottleneck layer with 256 units are kept the same. The model is then trained on a combined data set of 300 hours of a first type of data such as SWB GP-ASR data and 140 hours of second type of data, such as clean second type of data. Note that in this step, although the output layer has units for entity labels, the training targets are only words. In the joint ASR+SLU step, entity labels are introduced into the training transcripts and a joint ASR-SLU model is trained on the SWB+SLU data, starting from the final weights from the ASR-SLU adapt step. In the third and final fine tune SLU step, the joint ASR-SLU model is fine-tuned on just the 140 hours of SLU data.

FIG. 3A provides a summary table of the evaluation of the bag-of entities slot filling F1 score for speech input using CTC and Attention based models. In experiment [1A] in the table of FIG. 3A, the full transcript model of experiment [1A] is evaluated on the clean test data. Given that the SLU model is a word CTC model, an external language model (LM) is not used while decoding; instead, a simple greedy decode of the output is employed. This initial model has an F1 score of 91.7 for correctly detecting entity labels along with their values.

In experiment [2A], a similar SLU model is developed with full verbatim transcripts along with entity labels, but the ASR-SLU adapt and joint ASR+SLU adapt modules are skipped. The model is initialized with the pretrained SWB ASR model and the SLU model is directly trained. This model also achieves 91.7 F1 score, suggesting that the curriculum learning steps may not always be required.

In the next set of experiments of FIG. 3A, the importance of verbatim transcripts is analyzed for the training process. After the joint ASR+SLU module of experiment [1A], in experiment [3A], an SLU model is trained that recognizes just the semantic entity labels and their values in spoken order. It is observed that the model trained on spoken order semantic entities (without a full word-for-word verbatim transcript) learns to disregard words in the signal that are not entity values, while preserving just the semantic entity values along with their labels. This SLU model performs slightly better than full transcript model in [1A].

This experiment in extended in experiment [4A] by removing the use of transcripts entirely in the training process. This SLU model, after being initialized with a pre-trained ASR model, is trained directly to recognize entity labels and their values without any curriculum learning steps or verbatim transcripts. Table 300A indicates that the model drops slightly in performance, but remains on par with the baseline systems.

Finally, the SLU system is trained on the much harder task of recognizing alphabetically sorted entity labels and their values. After the joint ASR+SLU module of experiment [1A], in experiment [5A] an SLU model that recognizes just the semantic entity labels and their values is trained, but now in alphabetic order.

In experiment [6A] a similar model to [5A] is trained, but without any curriculum learning steps. For example, curriculum learning steps relate to pre-training an ASR model on full transcripts and using the model to initialize the SLU model. On this task, the performance of the CTC model drops significantly as it is unable to learn efficiently from reordered targets that are not in spoken order. With the curriculum learning steps, the results in [5A] are better, but still worse than the baselines.

Evaluating Attention Based SLU Models

In one embodiment, the attention models for SLU are initialized with an ASR model developed for standard Switchboard ASR task. This model uses an encoder-decoder architecture wherein the encoder is an 8-layer Long short-term memory (LSTM) stack using batch-normalization, residual connections, and linear bottleneck layers. The decoder models the sequence of Byte Pair Encoding (BPE) units estimated on characters, and comprises 2 unidirectional LSTM layers. One is a dedicated language-model-like component that operates only on the embedded predicted symbol sequence, and the other jointly processes acoustic and symbol information. In one example, the decoder applies additive, location aware attention, and each layer has 768 unidirectional LSTM nodes. Exploiting various regularization techniques, including SpecAugment, sequence-noise injection, speed-tempo augmentation, and various dropout methods, may result in advanced speech recognition performance using this single-headed sequence-to-sequence model.

To recognize entities, the ASR model is adapted similar to the CTC model, following the modules discussed above. In contrast to the CTC model, which uses word units, in one embodiment, the attention model uses a smaller inventory (e.g., of 600 BPE) units and relies on the decoder LSTMs to model longer sequences—the attention based model has an inherent long-span language model. After the initial ASR model is trained on Switchboard, the subsequent adaptation and transfer learning steps uses only the data without any Switchboard data. Because the attention model operates at the sub-word level, and all new words appearing in the transcripts can be modeled using these sub-word units, no extension of the output and embedding layer is needed in the first ASR-SLU adapt step. For simplicity, the joint ASR+SLU module is skipped and the SLU engine can proceed directly to the fine tune SLU module, where the output and the embedding layers of the decoder are extended with the semantic entity labels. The softmax layer and embedding weights corresponding to the semantic entity labels are randomly initialized, while all other parameters, including the weights, which correspond to previously known symbols in the softmax and embedding layers, are copied over from the ASR model. Having no out-of-vocabulary words, sub-word level models may be well suited to directly start the adaptation process with the "entities in natural spoken order" example 230 discussed above. In the present example, all adaptation steps use 5 epochs of training.

In experiment [6A] the table of FIG. 3A shows the slot filling F1 score for attention-based SLU models. In experiment [1A], an attention-based ASR model trained on Switchboard-300h is first adapted on the clean data to create a domain specific ASR model. On the test set, the word error rate (WER) using the base SWB-300 model is about 7.9% which improved to 0.6% after adaptation. This ASR model is then used as an initial model for transfer learning to create an SLU model. The F1 score is comparable to that of the CTC model.

In experiment [2A] of the table in FIG. 3A, the ASR adaptation step is skipped and the SWB-300 ASR model is used directly to initialize the SLU model training. In this scenario, there is no degradation in F1 score. There is no difference in SLU performance whether the model is initialized with a general purpose SWB-300 ASR model (WER=7.9%) or with a domain adapted ASR model (WER=0.6%).

Experiment [4A] of the table in FIG. 3A considers the effects of training transcription quality or detail. In the present example, using transcripts that include only entities in spoken order ([4A]), F1 scores are obtained that are substantially similar to using full transcripts of experiment [1A] of table 3A. When training transcripts include entities in alphabetic order (i.e., possibly different from spoken order), experiment [6A] demonstrates that there is a 2% degradation in F1 score, from 92.9 to 90.9. This result is much better than that for the CTC model (73.5), reflecting the re-ordering ability of attention-based models. As before, adding an extra step of ASR model adaptation as provided in experiments [3A] and [5A] of FIG. 3A with verbatim transcripts, makes little difference.

Figure 4:
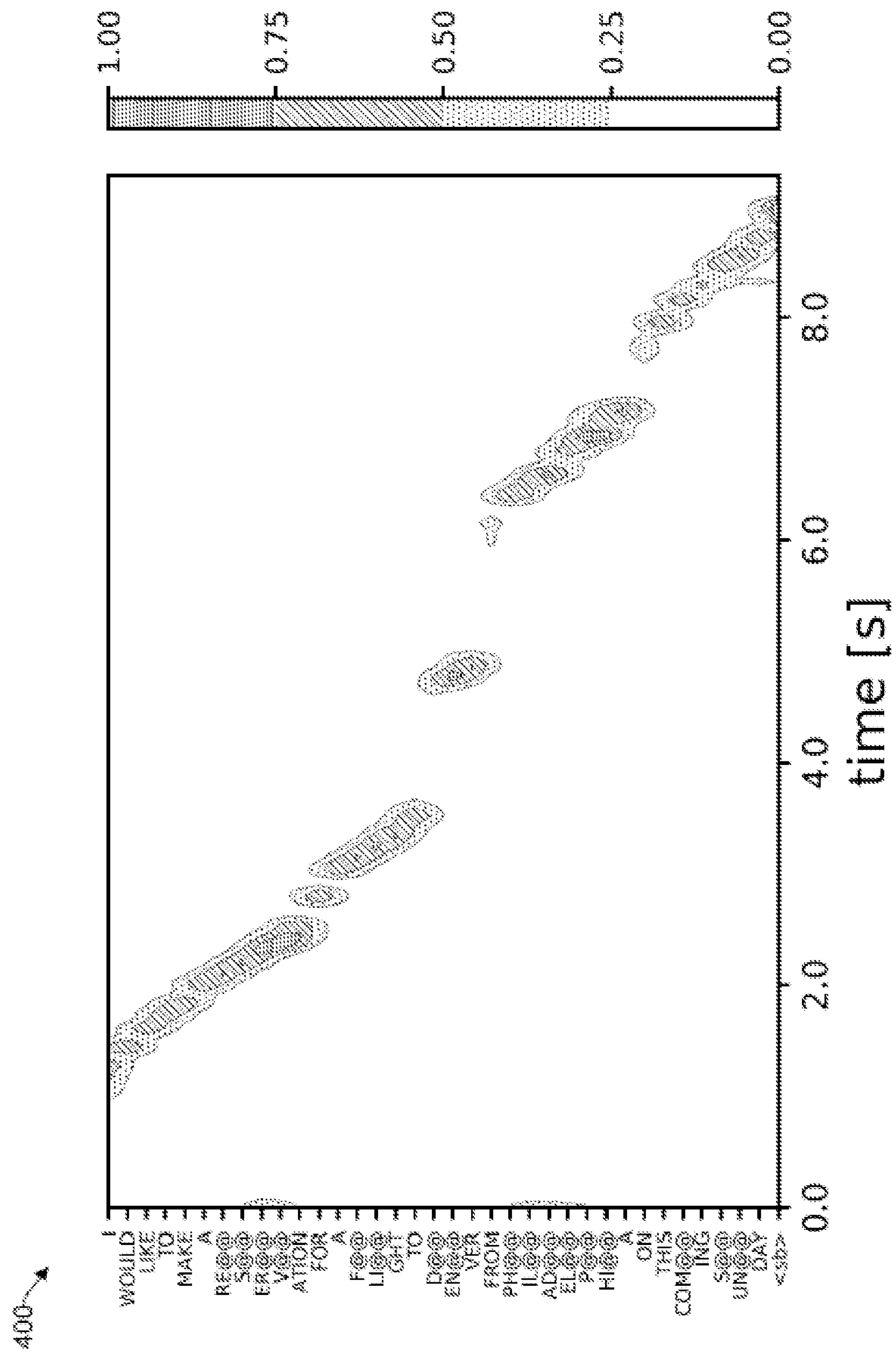
FIG. 4 illustrates an attention plot for an utterance using an ASR model.
Figure 5:
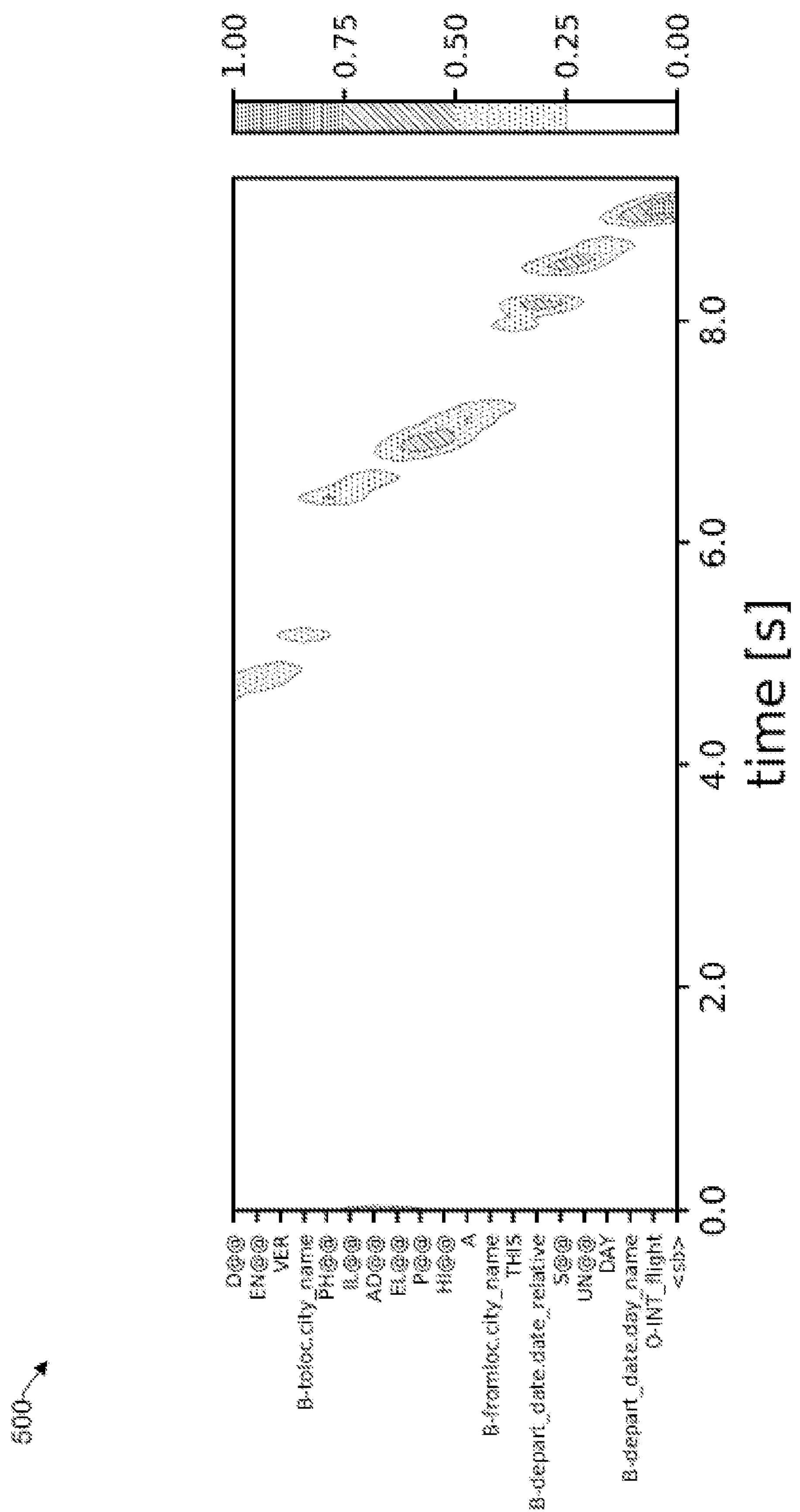
FIG. 5 illustrates an attention plot for an utterance using SLU in spoken order.
Figure 6:
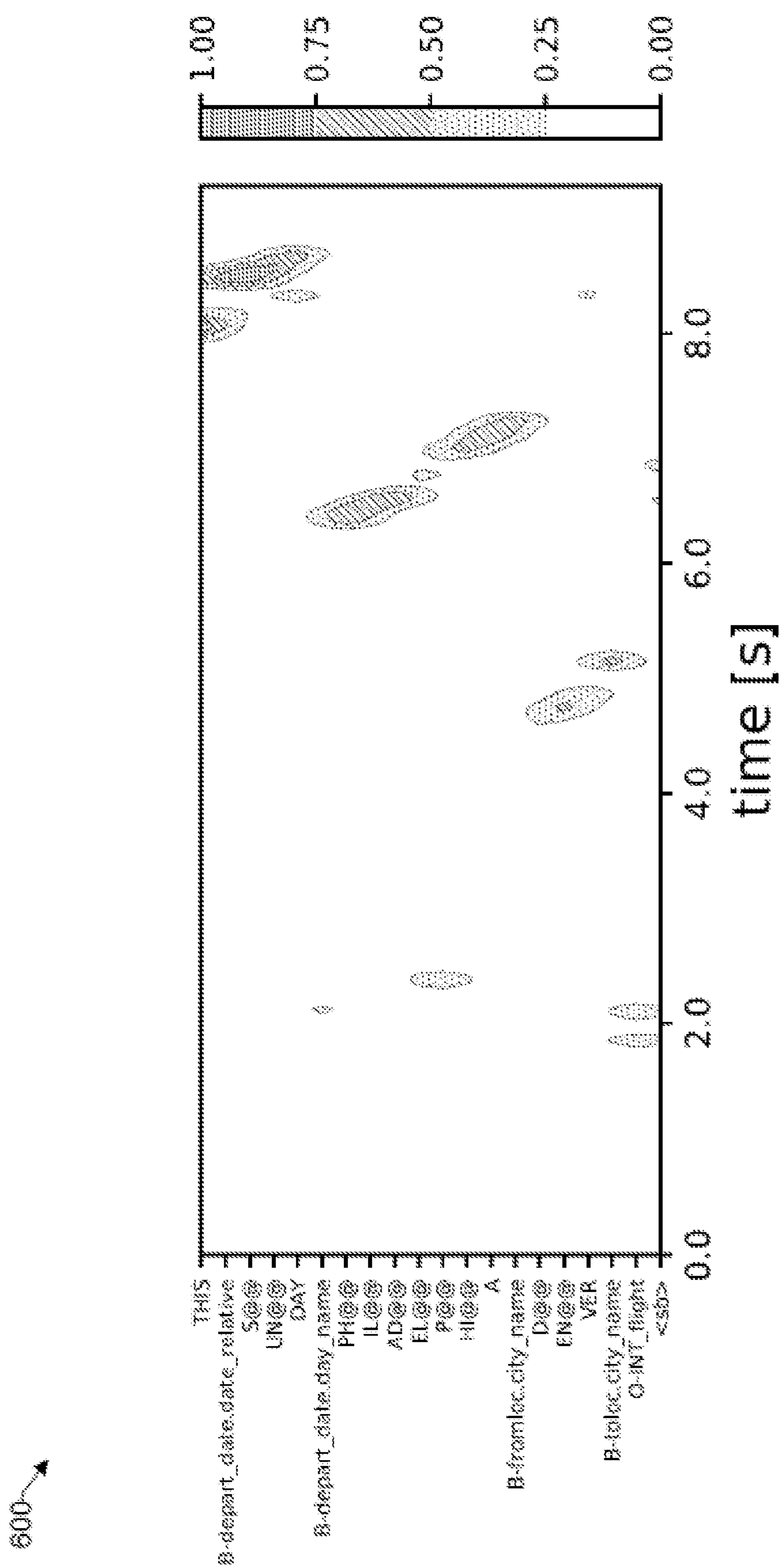
FIG. 6 illustrates an attention plot for an utterance using SLU in alphabetic order.

Reference now is made to FIGS. 4 to 6, which show attention plots for the utterance "I would like to make a reservation for a flight to Denver from Philadelphia on this coming Sunday" for three different attention models, respectively. More particularly, FIG. 4 illustrates an attention plot for an utterance using an ASR model; FIG. 5 illustrates an attention plot for an utterance using SLU in spoken order; and FIG. 6 illustrates an attention plot for an utterance using SLU in alphabetic order.

As illustrated in FIG. 5, the attention for the utterance is largely monotonic with attention paid on consecutive parts of the audio signal corresponding to BPE units of keywords in the semantic entities. There are gaps reflecting skipping over non-entity words.

As illustrated in FIG. 6, the attention for the utterance is piece-wise monotonic, where the monotonic regions cover the BPE units within a keyword. Since the semantic entities are given in an order different from spoken order, the plot shows how the model is able to associate the correct parts of the speech signal with the semantic entities. In addition, at approximately 2 seconds, attention is paid to the phrase "make a reservation," which is predictive of the overall intent of the sentence: "flight."

Reference now is made to FIG. 3B, which provides a summary table 300B of bag-of entities slot filling F1 score for speech input with additive street noise (5 dB SNR). More specifically, a noisy corpus is used as the SLU data set and the CTC based experiments conducted in the context of FIG. 3A are repeated. This set of experiments introduces additional variability to the training procedure with realistic noise in both training and test. Further, it increases the acoustic mismatch between the transferred model and the target domain. The general trends for the CTC model observed in table 300A of FIG. 3A are also observed in table 300B of FIG. 3B: (a) ASR transcript based curriculum training is effective; and (b) entity labels can be recognized well in spoken order, but the performance may be worse when the semantic entity order is different. In experiments as in [2B], the mismatch between the SLU data and the ASR data affects the performance of models that are only initialized with mismatched pre-trained models and have no other adaptation steps. The noise distortion in general causes these systems to drop in performance compared to the performance results in matched conditions.

As illustrated in the example of table 300B of FIG. 3B, for attention based SLU models in more detail, there is an absolute degradation of 4.3% in F1 score when a model trained on full transcripts (e.g., [1B] F1=92.0) is compared to one trained on entities in alphabetic order ([6B] F1=87.7%). While this is a drop in performance, it is substantially better than the CTC result of ([6B] F1=68.5). Compared to the clean speech condition, a different conclusion regarding the utility of ASR adaptation can be reached. There is about 1% improvement in F1 score when an adapted ASR model instead of the base SWB-300 model is used to initialize SLU model training. On the noisy test set, using the base SWB-300 model results in WER=60%, whereas the ASR model adapted on noisy data provides WER=5%. Significantly, by virtue of using these two very different ASR models to initialize the SLU model training a mere 1% difference in F1 scores for the final models is achieved.

FIG. 3C shows a table 300C of how the amount of data used to train the ASR model for initializing SLU training affects the final F1 score. Table 300C shows results for attention-based SLU models trained on entities in spoken order for clean (i.e., non-noisy) speech. In the example of FIG. 3C, 2000h used instead of 300h for the initial ASR model improves the F1 score by approximately 1%. This may be due to increased robustness of the model to unseen data: the un-adapted WER on the test set is 3.1% (SWB2000h) vs. 7.9% (SWB300h). In contrast, when the SLU model is trained directly from scratch (e.g., from random parameters, without initializing from a pre-trained ASR model), the experiment provided about F1=78.1. When SLU data is limited, these experiments demonstrate the importance of ASR pre-training on a broad range of speech data, not necessarily related to the final SLU task.

Accordingly, the teachings herein demonstrate that various E2E SLU models can be successfully constructed without verbatim transcripts. Based on the teachings herein, similar results can be obtained with other E2E SLU models that are neural network based, including other sequence transduction models such as RNN-T (recurrent neural network transducer) and Transformer based models. In one aspect, pre-trained acoustic models and curriculum learning are used to train these systems. Using clean and noisy versions of data, the effects of entity order and acoustic mis-match on performance of these systems are explained. The E2E systems discussed herein are trained without verbatim transcripts and can predict entities reliably even if trained on transcripts where entities are not necessarily given in spoken order. The present teachings provide useful insights to training better SLU systems in practical settings where full transcripts are often not available for training and the final SLU systems are to be deployed in noisy acoustic environments. Although we have presented details of an embodiment where the SLU is trained on one type of training data (210, 220, 230, 240 in FIG. 2), the SLU can also be trained on a combination of different types of training data (210, 220, 230, 240).

Example Process

Figure 7A:
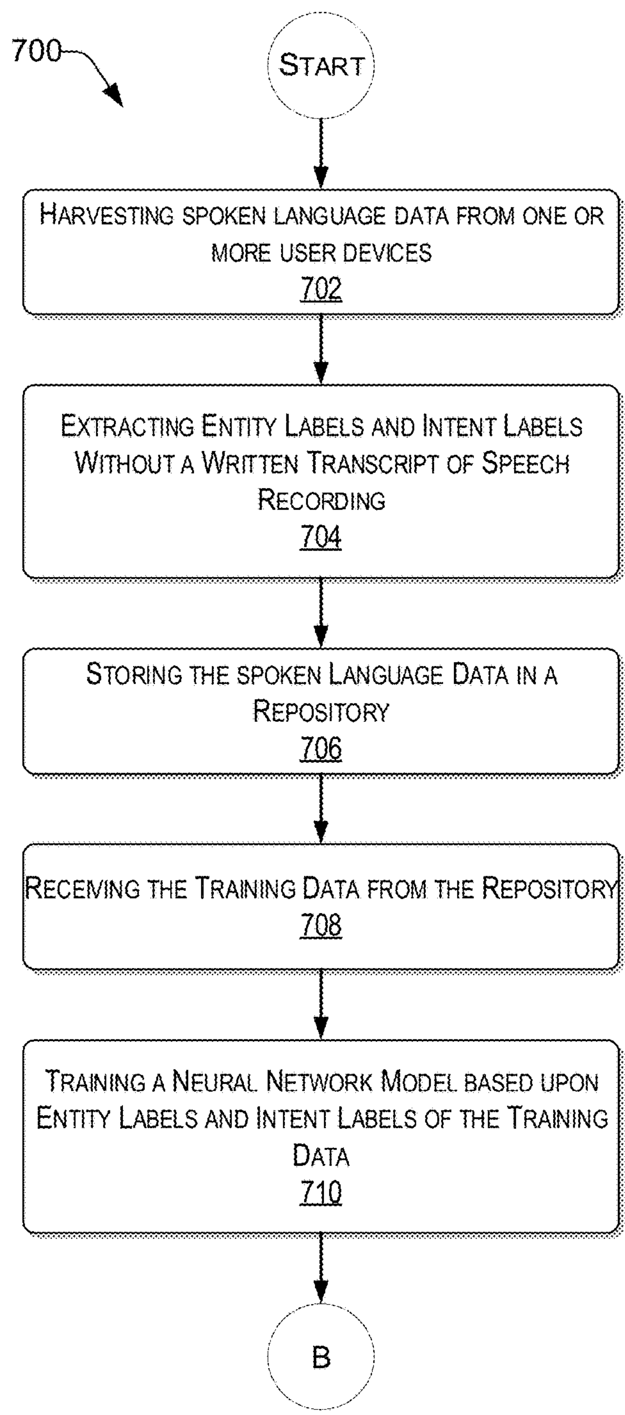
FIGS. 7A and 7B present illustrative processes of an end to end spoken language understanding system during a training stage and an active stage, respectively, consistent with an illustrative embodiment.

With the foregoing overview of the example architecture 100 and different training approaches of FIGS. 3A to 3C, it may be helpful now to consider a high-level discussion of an example process. To that end, FIGS. 7A and 8A present illustrative processes 700 and 760 of an end to end spoken language understanding system during a training stage and an active stage, respectively, consistent with an illustrative embodiment. Processes 700 and 760 are illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 700 and 760 are described with reference to the architecture 100 of FIG. 1.

Process 700 of FIG. 7A represents a training phase of a spoken language understanding system. At block 702, spoken language data 105(1) is harvested from one or more user devices 102(1) to 102(N) over a network 106. The spoken language data (e.g., 105(1) to 105(N)) comprises (i) audio speech recording and (ii) a set of semantic entities and/or an overall intent for each corresponding speech recording. In one embodiment, the semantic entities do not include a transcript of the audio speech recording. In other embodiments, the transcript is filtered out (e.g., by the SLU engine 103) before it is stored in the historical data repository 112, or later upon receiving the data from the historical data repository 112. Stated differently, the entity labels/values and intent labels are extracted from the semantic entities without a verbatim transcript of the speech recording. For example, the entity labels/values and intent labels in the written transcript (if provided) are extracted therefrom and terms—except for the entity labels/values and intent labels—are removed.

At block 706, the spoken language data is stored in a repository, which may be a memory of the SLU server and/or the historical data repository 112.

At block 708, the SLU engine 103 receives the historical data 113 as training data from the repository 112. Each of the semantic entities of the training data need not include a transcript of the corresponding audio speech recording. In various embodiments, the receipt of the training data may be at predetermined intervals or upon a trigger event, such as a threshold number of new spoken language data being available in the data repository 112.

At block 710, an SLU model is trained based upon the entity labels/values and intent labels of the historical data. Significantly, the training does not need to include a verbatim transcript of the corresponding spoken language.

During an active phase, the trained SLU model can be used to determine a meaning of a spoken language, as discussed by way of example below.

At block 762 raw spoken language data is received by the SLU engine 103 from a user device (e.g., 102(1)) over the network 106.

At block 764, the trained SLU model is used to recognize one or more semantic entities and/or intents of the raw spoken language data without a transcript of the audio speech recording. In one embodiment, the audio speech recording and the set of semantic entities and/or intents of the raw spoken language data is stored in the historical data repository without a transcript thereof. In this way, the training set can be continuously improved, while avoiding storing parameters of conversations that are not sufficiently salient for the training of SLU models.

Example Computer Platform

Figure 7B:
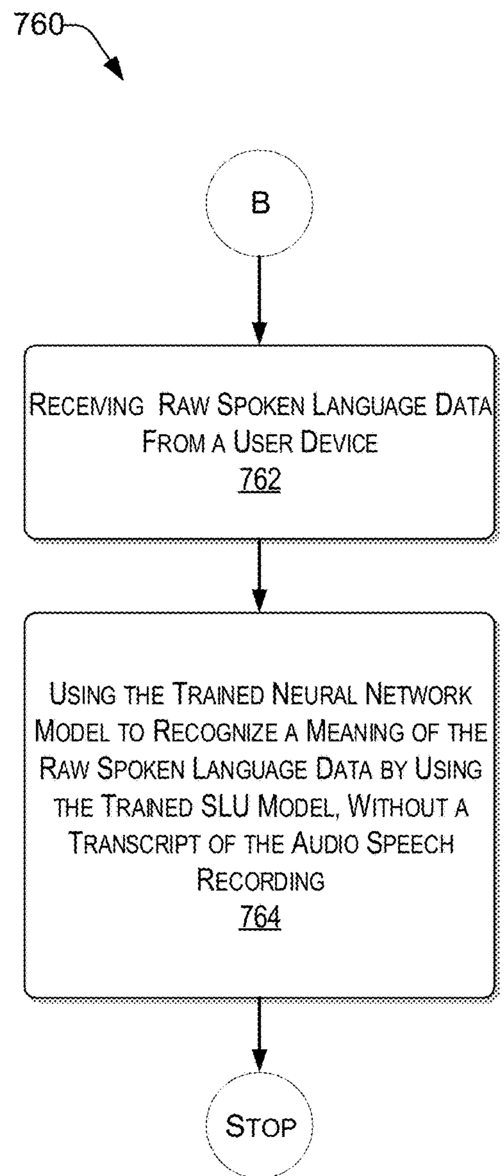
Figure 8:
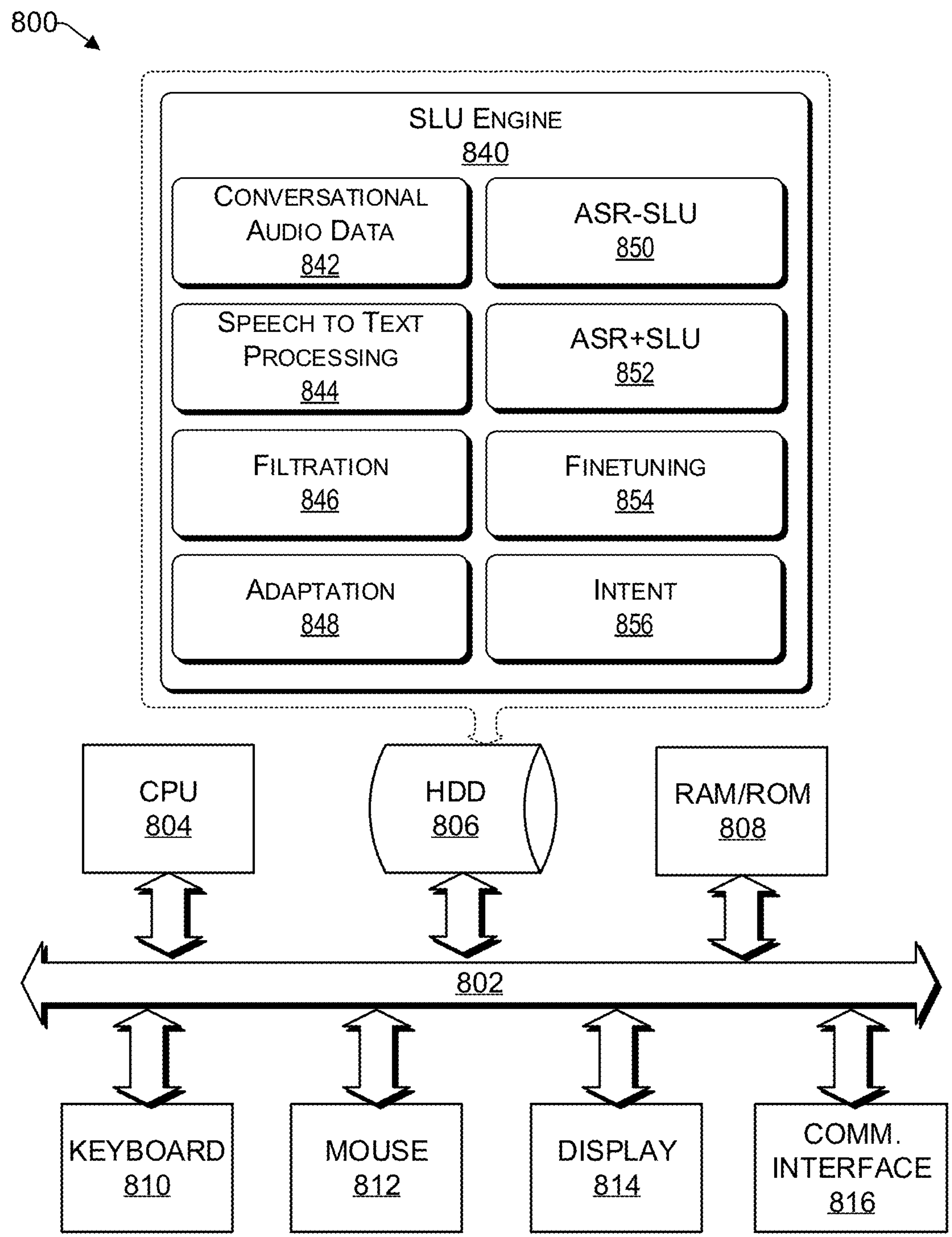
FIG. 8 provides a functional block diagram illustration of a computer hardware platform that can be used to implement a particularly configured computing device that can host a semantic entity annotation engine.

As discussed above, functions relating to training an SLU model and determining the meaning of an utterance, can be performed with the use of one or more computing devices connected for data communication via wireless or wired communication, as shown in FIG. 1 and in accordance with the process 700 and 760 of FIGS. 7A and 7B. FIG. 8 provides a functional block diagram illustration of a computer hardware platform 800 that can be used to implement a particularly configured computing device that can host an SLU engine 840. In particular, FIG. 8 illustrates a network or host computer platform 800, as may be used to implement an appropriately configured server, such as the SLU server 116 of FIG. 1.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the SLU engine 840, in a manner described herein. The SLU engine 840 may have various modules configured to perform different functions, such those discussed in the context of FIG. 1 and others. For example, there may be a conversation module 842 operative to harvest conversations between a user and an administrator and/or a chatbot. There may be a text processing module 844 operative to convert the voice content into text. There may be a filtration module operative to extract entity labels and intent labels in a written transcript (if provided) and to remove all other terms. There may be an intent adaptation module 848 that is operative to convert semantic entities that are in random or alphabetic order into a spoken language order for further processing. There may be ASR-SLU adaptation module 850 and/or an ASR+SLU adaptation module 852 to perform the functions described herein. There may be a finetuning module 854 operative to cooperate with the ASR-SLU adaptation module 850 and/or the ASR+SLU adaptation module 852 to finetune a model to create a final SLU model. There may be an intent module 856 that is operative, during an active phase, to determine an intent of an utterance without the need of a transcript of the utterance.

While modules 842 to 856 are illustrated in FIG. 8 to be part of the HDD 806, in some embodiments, one or more of these modules may be implemented in the hardware of the computing device 800. For example, the modules discussed herein may be implemented in the form of partial hardware and partial software. That is, one or more of the components of the SLU engine 840 shown in FIG. 8 may be implemented in the form of electronic circuits with transistor(s), diode(s), capacitor(s), resistor(s), inductor(s), varactor(s) and/or memristor(s). In other words, SLU engine 840 may be implemented with one or more specially-designed electronic circuits performing specific tasks and functions described herein.

In one embodiment, a program can be stored for operating the system as a Web server. In one embodiment, the HDD 806 can store an executing application that includes one or more library software modules, which execute with or without the assistance of a virtual machine, with a scripting language, or in another manner.

Example Cloud Platform

As discussed above, functions relating to managing the compliance of one or more client domains, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
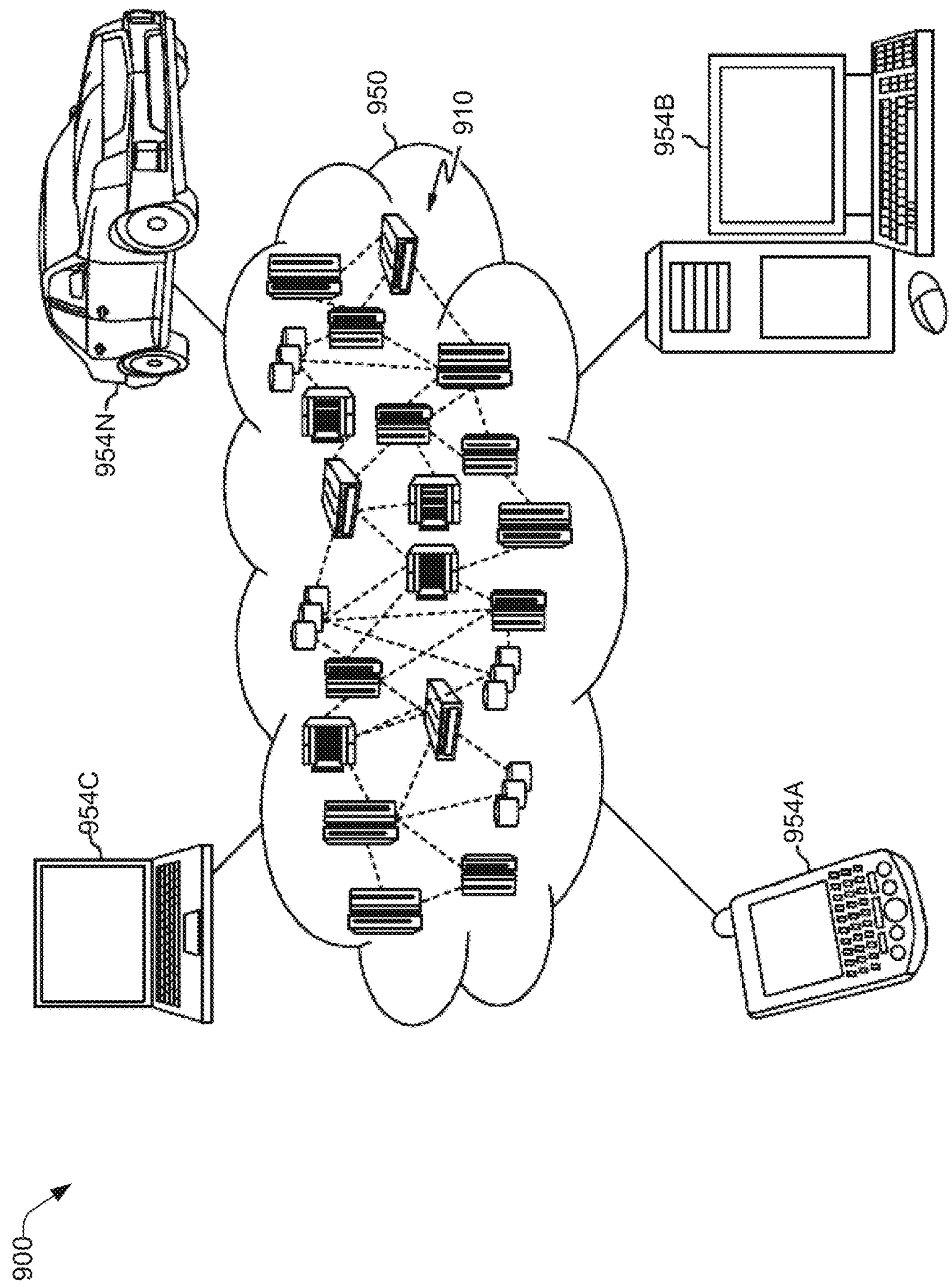
FIG. 9 depicts a cloud computing environment, consistent with an illustrative embodiment.

Referring now to FIG. 9, an illustrative cloud computing environment 900 is depicted. As shown, cloud computing environment 900 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
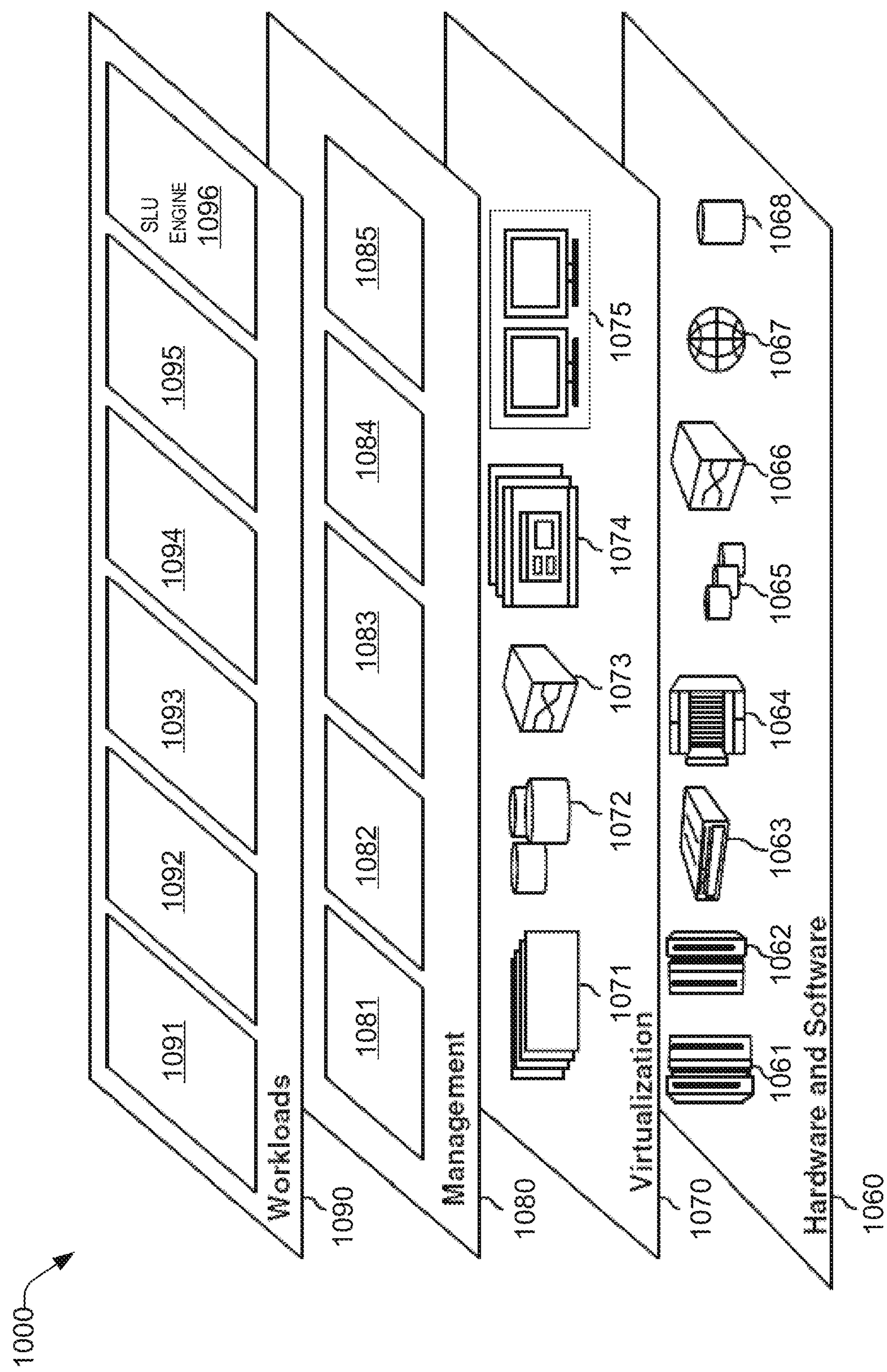
FIG. 10 depicts abstraction model layers, consistent with an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and SLU engine 1096, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:

a processor;

a network interface coupled to the processor to enable communication over a network;

an engine configured to perform acts comprising, during a training phase of a spoken language understanding (SLU) model:

receiving, over the network, natural language training data comprising (i) one or more speech recording, and (ii) a set of semantic entities and/or an overall intent for each corresponding speech recording;

for each speech recording, extracting (i) one or more entity labels and corresponding values, and (ii) one or more intent labels from the corresponding semantic entities and/or overall intent; and training the SLU model based upon, the one or more entity labels and corresponding values, and one or more intent labels of the corresponding speech recordings, without a need for a transcript of the corresponding speech recording.

2. The computing device of claim 1, wherein the semantic entities are not in spoken order.

3. The computing device of claim 2, wherein the semantic entities are in alphabetical order.

4. The computing device of claim 2, wherein the natural language training data is based on a combination of different types of training data.

5. The computing device of claim 2, wherein the engine is further configured to perform acts, comprising performing a pre-processing alignment to align the semantic entities into spoken order.

6. The computing device of claim 1, wherein the training data is based on transaction data between a user and an administrator helping the user with a task.

7. The computing device of claim 1, wherein the training data comprises a record of transaction data comprising a bag of entities.

8. The computing device of claim 1, wherein the extraction of the one or more entity labels and corresponding values, and the one or more intent labels is by way of a neural network processing comprising at least one of connectionist temporal classification (CTC), recurrent neural network transducer (RNN-T), or attention-based encoder-decoder neural network.

9. The computing device of claim 1, wherein the training involves a transfer learning comprising initializing the SLU model with an automatic speech recognition (ASR) model.

10. The computing device of claim 1, wherein the SLU engine is further configured to perform acts, comprising, during an active phase:

receiving raw spoken language data comprising an audio speech recording without a transcript of the audio speech recording; and using the trained SLU model to recognize a meaning of the raw spoken language data, wherein the meaning comprises an intent and semantic entities of the raw spoken language.

11. A non-transitory computer readable storage medium tangibly embodying a computer readable program code having computer readable instructions that, when executed, causes a computer device to carry out a method of training a spoken language understanding (SLU) model, comprising:

receiving natural language training data comprising (i) one or more speech recording, and (ii) a set of semantic entities and/or an overall intent for each corresponding speech recording;

for each speech recording, extracting (i) one or more entity labels and corresponding values, and (ii) one or more intent labels from the corresponding semantic entities and/or overall intent; and training the spoken language understanding (SLU) model based upon the one or more entity labels and corresponding values, and one or more intent labels of the corresponding speech recordings, without a need for a transcript of the corresponding speech recording.

12. The non-transitory computer readable storage medium of claim 11, wherein the semantic entities are not in spoken order.

13. The non-transitory computer readable storage medium of claim 12, wherein the natural language training data is based on a combination of different types of training data.

14. The non-transitory computer readable storage medium of claim 13, the method further comprising performing a pre-processing alignment to align the semantic entities into spoken order.

15. The non-transitory computer readable storage medium of claim 11, wherein the training data is based on transaction data between a user and an administrator helping the user with a task.

16. The non-transitory computer readable storage medium of claim 11, wherein the training data comprises a record of transaction data comprising a bag of entities.

17. The non-transitory computer readable storage medium of claim 11, wherein the extraction of the one or more entity labels and corresponding values, and the one or more intent labels is by way of a neural network processing comprising at least one of connectionist temporal classification (CTC), recurrent neural network transducer (RNN-T), or attention-based encoder-decoder neural network.

18. The non-transitory computer readable storage medium of claim 11, wherein the training involves a transfer learning comprising initializing the SLU model with an automatic speech recognition (ASR) model.

19. The non-transitory computer readable storage medium of claim 11, the method further comprising, during an active phase:

receiving raw spoken language data comprising an audio speech recording without a transcript of the audio speech recording; and using the trained SLU model to recognize a meaning of the raw spoken language data, wherein the meaning comprises an intent and semantic entities of the raw spoken language.

20. A computer implemented method comprising:

during a training phase of a spoken language understanding (SLU) model, receiving natural language training data comprising (i) one or more speech recording, and (ii) a set of semantic entities and/or an overall intent for each corresponding speech recording;

for each speech recording, extracting (i) one or more entity labels and corresponding values, and (ii) one or more intent labels from the corresponding semantic entities and/or overall intent; and training the SLU model based upon the one or more entity labels and corresponding values, and one or more intent labels of the corresponding speech recordings, without a need for a transcript of the corresponding speech recording.

* * * * *